United States Patent
Kuchipudi

(10) Patent No.: US 11,821,778 B1
(45) Date of Patent: Nov. 21, 2023

(54) TANK LEVEL SENSING

(71) Applicant: DEERE & COMPANY, Moline, IL (US)

(72) Inventor: Uday Kumar Kuchipudi, Khammam Urban (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/662,128

(22) Filed: May 5, 2022

(51) Int. Cl.
| | |
|---|---|
| *G01F 23/80* | (2022.01) |
| *G01F 23/72* | (2006.01) |
| *G01C 19/34* | (2006.01) |
| *G01F 13/00* | (2006.01) |
| *G01F 23/28* | (2006.01) |

(52) U.S. Cl.
CPC ........... *G01F 23/804* (2022.01); *G01C 19/34* (2013.01); *G01F 13/006* (2013.01); *G01F 23/28* (2013.01); *G01F 23/72* (2013.01)

(58) Field of Classification Search
CPC .................................................... G01C 19/34
See application file for complete search history.

(56) References Cited

U.S. PATENT DOCUMENTS

| | | | |
|---|---|---|---|
| 4,228,638 A | 10/1980 | Rabe et al. | |
| 6,067,917 A * | 5/2000 | Nimberger | A01C 23/024 111/119 |
| 8,656,830 B2 | 2/2014 | Kraus | |
| 2004/0129075 A1* | 7/2004 | Sorenson | G01F 23/38 73/317 |
| 2017/0359941 A1* | 12/2017 | Czapka | A01B 59/042 |

* cited by examiner

*Primary Examiner* — Paul M. West
*Assistant Examiner* — Mark A Shabman

(57) ABSTRACT

A method of monitoring a level of a liquid in a tank of a moveable vehicle includes sensing an orientation of the moveable vehicle relative to a horizontal plane with a vehicle orientation sensor, determining if the orientation of the moveable vehicle is less than an allowable orientation threshold or if the orientation of the moveable vehicle is equal to or greater than the allowable orientation threshold, measuring a level of the liquid in the tank of the moveable vehicle with a liquid level sensor when the orientation of the moveable vehicle is less than the allowable orientation threshold, defining a sensed fluid level value with the controller, and saving the sensed fluid level value in a memory of the controller. The sensed fluid level value is based on the measured level of the liquid when the orientation of the moveable vehicle is less than the allowable orientation threshold.

23 Claims, 9 Drawing Sheets

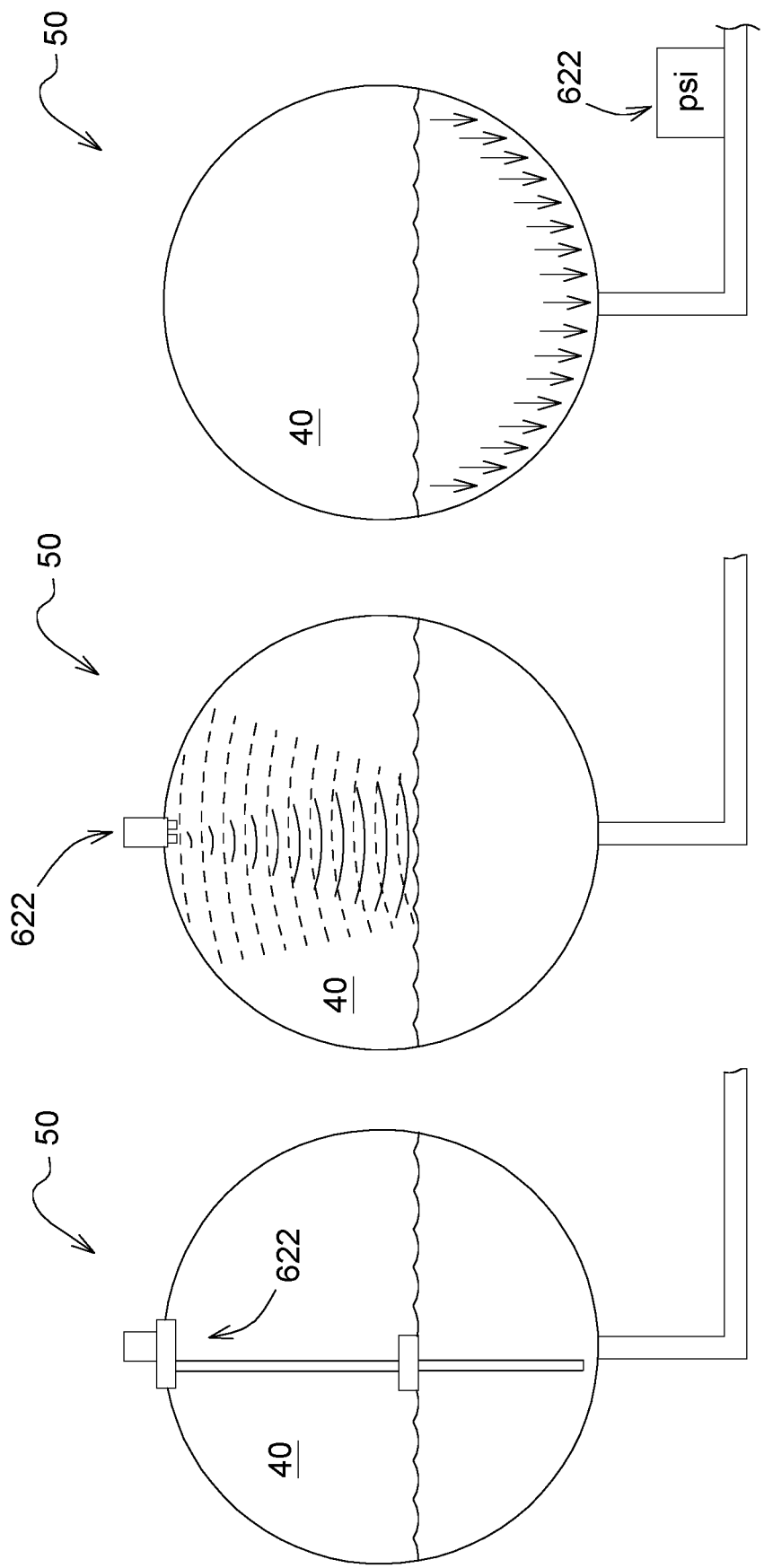

TANK LEVEL SENSING

RELATED APPLICATIONS

N/A.

FIELD OF THE DISCLOSURE

The present disclosure relates generally to a system of a moveable vehicle that monitors a level of a liquid in a tank of the moveable vehicle.

BACKGROUND OF THE DISCLOSURE

Some moveable vehicles may include or be coupled to a tank for a specific use. The moveable vehicle herein may be self-propelled or is dawn by another vehicle, such as a tractor. One example of the tank is a preservative tank coupled to a baler implement. The preservative is dispensed to the hay in the baling process or a finished bale through nozzle(s). The potential benefits of applying preservatives to hay either during a baling process or to the finished bale are well known and include (a) permitting the hay to be baled and stored at higher moisture contents without spoilage, thus reducing field losses and making operation less dependent on favorable weather conditions; (b) improved palatability and digestibility; and (c) higher nutrient content. However, a fluid level of the preservative may not be properly when the baler implement is operated at an uneven or slop terrain.

SUMMARY OF THE DISCLOSURE

According to an aspect of the present disclosure, a method of monitoring a level of a liquid in a tank of a moveable vehicle includes sensing an orientation of the moveable vehicle relative to a horizontal plane with a vehicle orientation sensor, determining, with a controller, if the orientation of the moveable vehicle is less than an allowable orientation threshold or if the orientation of the moveable vehicle is equal to or greater than the allowable orientation threshold, measuring a level of the liquid in the tank of the moveable vehicle with a liquid level sensor when the orientation of the moveable vehicle is less than the allowable orientation threshold; defining a sensed fluid level value with the controller, and saving the sensed fluid level value in a memory of the controller. The sensed fluid level value is based on the measured level of the liquid when the orientation of the moveable vehicle is less than the allowable orientation threshold.

A system for monitoring a level of a liquid in a tank of a moveable vehicle includes a vehicle orientation sensor, a controller, and a liquid level sensor. The vehicle orientation sensor is operable to sense an orientation of the moveable vehicle relative to a horizontal plane. The controller is coupled to the vehicle orientation sensor and is operable to determine if the orientation of the moveable vehicle is less than an allowable orientation threshold or if the orientation of the moveable vehicle is equal to or greater than the allowable orientation threshold. The liquid level sensor is coupled to the controller and is operable to measure a level of the liquid in the tank of the moveable vehicle. The controller is operable to define a sensed fluid level value based on the measured level of the liquid when the orientation of the moveable vehicle is less than the allowable orientation threshold. The controller is operable to save the sensed fluid level value in a memory of the controller.

Other features and aspects will become apparent by consideration of the detailed description and accompanying drawings.

BRIEF DESCRIPTION OF THE DRAWINGS

The detailed description of the drawings refers to the accompanying figures in which:

FIG. 4A is a schematic perspective view of a vehicle orientation sensor.

FIG. 4B is a schematic perspective view of another vehicle orientation sensor.

FIG. 4C is a schematic perspective view of another vehicle orientation sensor.

DETAILED DESCRIPTION OF THE DRAWINGS

The present disclosure includes a system for monitoring a level of a liquid in a tank of a moveable vehicle and the method thereof. The moveable vehicle includes the tank and can be, for example, a baler implement, a planter, a sprayer, a tractor, and construction vehicle. The liquid in the tank can be preservative, liquid fertilizer, water, and fuel, etc. The description below uses a baler implement having a preservative for explanatory purpose.

Figure 1:
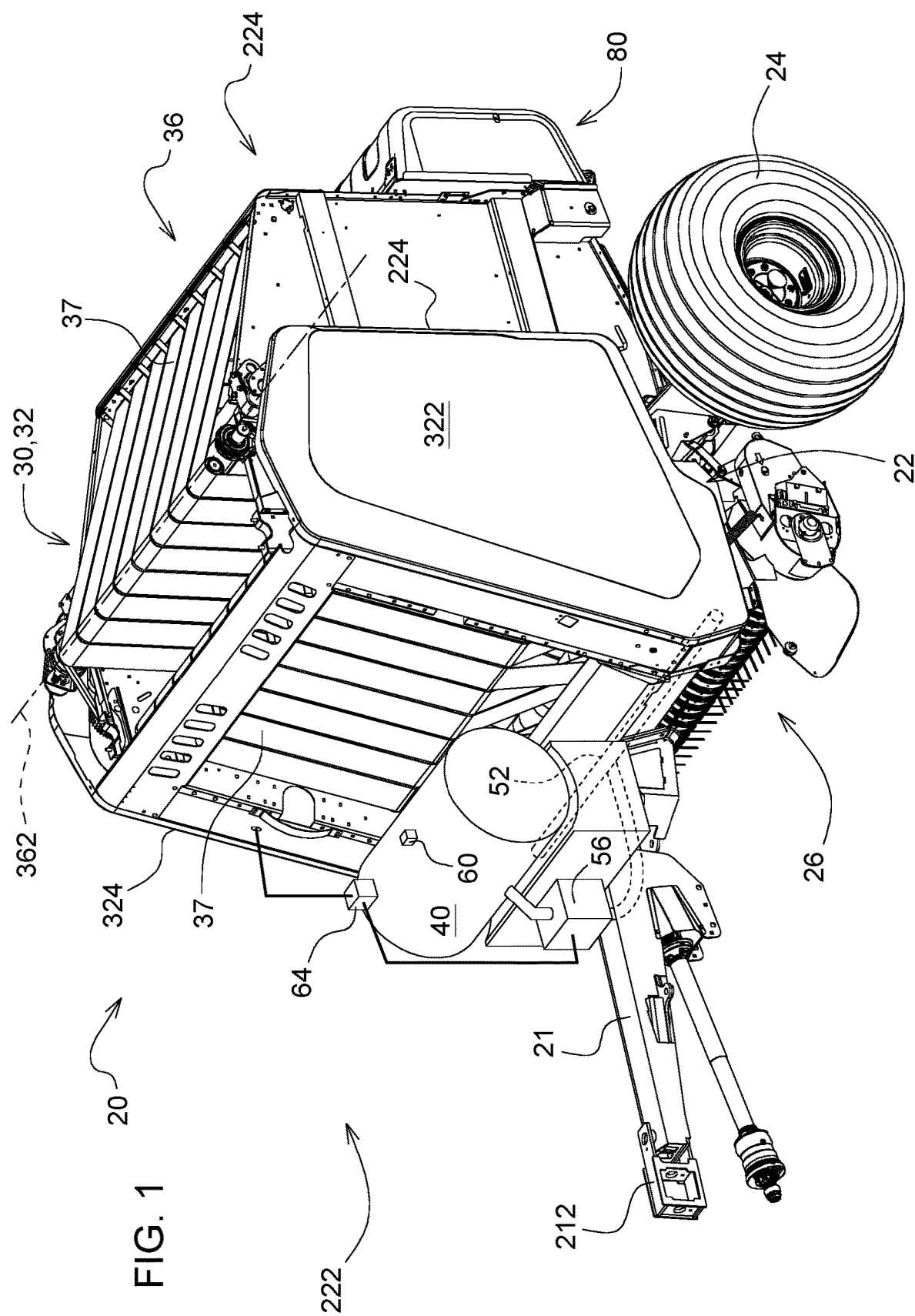
FIG. 1 is a schematic perspective view of a baler implement.
Figure 2:
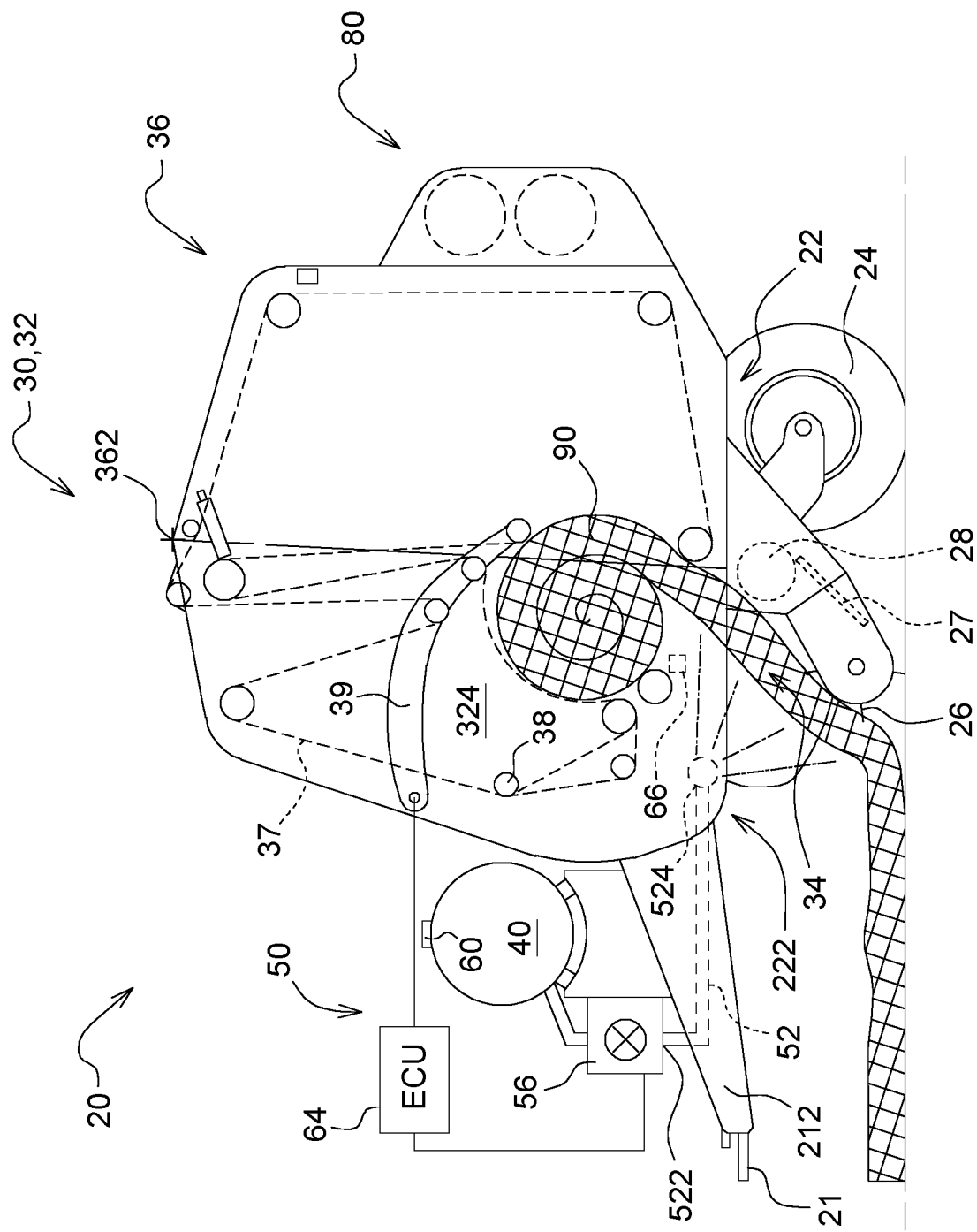
FIG. 2 is a schematic side view of the baler implement of FIG. 1.

Referring to FIGS. 1 and 2, a baler implement 20 is generally shown. The baler implement 20 in this implementation is a round baler with a variable baling chamber; in another implementation, the baler implement 20 can be a round baler with a fixed baling chamber. The baler implement 20 includes a main frame 22. The main frame 22 extends along a central longitudinal axis 226 between a forward end 222 and a rearward end 224 relative to a direction of travel. One or more ground engaging elements 24, such as but not limited to one or more wheels and/or tracks, are attached to and rotatably supported by the main frame 22. A tongue 21 may be coupled to the main frame 22 at a forward end 222 of the main frame 22. A hitch arrangement 212 may be included with the tongue 21. The hitch arrangement 212 may be used to attach the baler implement 20 to a traction unit (not shown), such as but not limited to an agricultural tractor. In other embodiments, the baler implement 20 may be self-propelled, in which case the traction unit and the baler implement 20 are configured as a single, self-propelled vehicle.

The baler implement 20 includes a baling system 30 having a housing 31 forming a baling chamber 32. The housing 31 is attached to and supported by the main frame 22. The housing 31 may include one or more walls or panels that at least partially enclose and/or define the baling chamber 32. The baling chamber 32 has a first lateral side 322 and a second lateral side 324, as parts of the inner portion of the housing 31, which define the width of the baling chamber 32 in the lateral direction. The baler implement 20 further includes a gate 36. The gate 36 is attached to and rotatably supported by the housing 31. The gate 36 is positioned adjacent a rearward end 224 of the main frame 22 and is pivotably moveable about a gate axis 362. The gate axis 362 is generally horizontal and perpendicular to the central longitudinal axis 226 of the main frame 22. The gate 36 is moveable between a closed position for forming a bale 90 within the baling chamber 32, and an open position for discharging the bale 90 from the baling chamber 32.

The baler implement 20 includes a pick-up 26 disposed proximate the forward end 222 of the main frame 22. The pick-up 26 gathers crop material from a ground surface and directs the gathered crop material toward and into an inlet 34 of the baling chamber 32. The pick-up 26 moves crop material along a crop path 92 relative to the main frame 22. The pick-up 26 may include, but is not limited to tines, forks, augers, conveyors, baffles, etc., for gathering and moving the crop material. The baler implement 20 may be equipped with a pre-cutter 28, disposed between the pick-up 26 and the inlet 34. As such, the pre-cutter 28 is disposed downstream of the pick-up 26 and upstream of the inlet 34 relative to a direction of travel of the crop material. The pre-cutter 28 cuts or chops the crop material into smaller pieces. The baler implement 20 may include a base floor 27 adjacent to the pick-up 26 and under the pre-cutter 28. The base floor 27 may be a concave shape and guide the crop material toward the inlet 34.

The baler implement 20 may be configured as a variable chamber baler, or as a fixed chamber baler. The baler implement 20 shown in the FIGS. 1 and 2 and described herein is depicted and described as a variable chamber baler. As is understood by those skilled in the art, the variable chamber baler includes a plurality of longitudinally extending side-by-side forming belts 37 that are supported by a plurality of rollers 38. The bale 90 is formed by the forming belts 37 and one or more side walls of the housing 31.

The crop material is directed through the inlet 34 and into the baling chamber 32, whereby the forming belts 37 roll the crop material in a spiral fashion into the bale 90 having a cylindrical shape. The forming belts 37 apply a constant pressure to the crop material as the crop material is formed into the bale 90. A belt tensioner 39 continuously moves the forming belts 37 radially outward relative to a center of the cylindrical bale 90 as the diameter of the bale 90 increases. The belt tensioner 39 maintains the appropriate tension in the belts 37 to obtain the desired density of the crop material.

The baler implement 20 includes a wrap system 80. The wrap system 80 is operable to wrap the bale 90 with a wrap material inside the baling chamber 32. Once the bale 90 is formed to a desired size, the wrap system 80 feeds the wrap material into the baling chamber 32 to wrap the bale 90 and thereby secure the crop material in a tight package and maintain the desired shape of the bale 90. The wrap material may include, but is not limited to, a twine, a net mesh, or a solid plastic wrap. Movement of the gate into the open position simultaneously moves the belts clear of the formed bale 90 and allows the formed and wrapped bale to be discharged through the rear of the baling chamber 32.

The baler implement 20 may include a preservative tank 40 and a dispensing apparatus 50 coupled to the preservative tank 40. As shown in FIG. 2, the preservative tank 40 may be mounted upon a base above the tongue 21 at the front of the baler implement 20. In other implementations, the preservative tank 40 may be coupled to the rearward portion of the main frame 22 or coupled to the rearward portion of a tractor that tows the baler implement 20. In an alternative implementation, the preservative tank 40 is coupled to the upper forward portion of the main frame 22 of the baler implement 20. The location of the preservative tank 40 shown in FIGS. 1 and 2 is merely explanatory. The preservative is stored in the preservative tank 40. The preservative is dispensed to the crop material via the dispensing apparatus 50 during the baling process or to a finished bale to permit the crop material to be baled and stored at higher moisture contents without spoilage, thus reducing field losses and making operation less dependent on favorable weather conditions, to improve palatability and digestibility of the crop material and/or to apply higher nutrient content on the crop material.

Figure 3A:
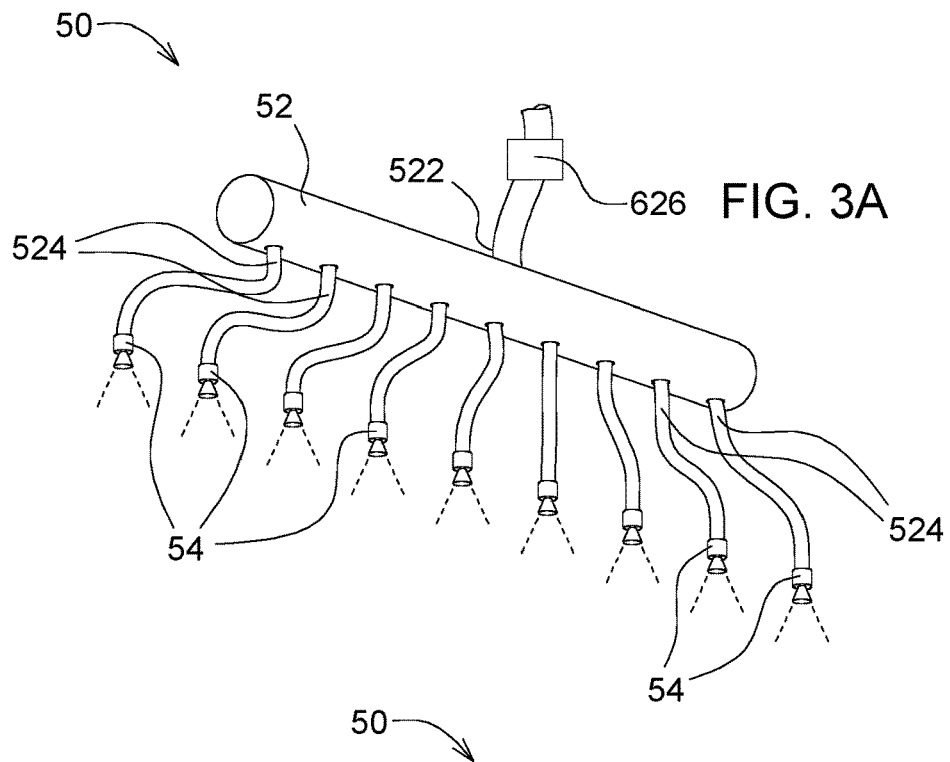
FIG. 3A is a schematic perspective view of a dispensing apparatus.

As shown in FIG. 3A, the dispensing apparatus 50 includes a manifold 52 having an inlet 522 coupled to the preservative tank 40 and outlets 524 coupled to nozzles 54 with multiple hoses. The nozzles 54 may be aligned in the lateral direction and is supported by a support structure (not shown) coupled to the main frame 22. The preservative may be sprayed to the crop materials through the nozzles 54 before the crop material is rolled up in the spiral fashion, as shown in FIG. 2. That is, the preservative is applied on the crop material when the crop material flows from the pick-up 26 to the inlet 34 of the baling chamber 32. In other implementation, the nozzles 54 may be disposed adjacent to the inlet 34 of the baling chamber 32 and spraying the preservative on the rolling bale 90 or finished/formed bale 90.

The nozzles 54 may be lower than the preservative tank 40 so as to form a fluid pressure by gravity. Additionally, or alternatively, the dispensing apparatus 50 may further include a fluid pump 56 to draw the preservative and facilitate the spray. The fluid pump 56 may be a single speed pump, two speed pump, or variable speed pump that draws the preservative from the preservative tank and changes the flow rate of the preservative. The fluid pump 56 may also be applied to other implementations of the dispensing apparatus 50.

Figure 3B:
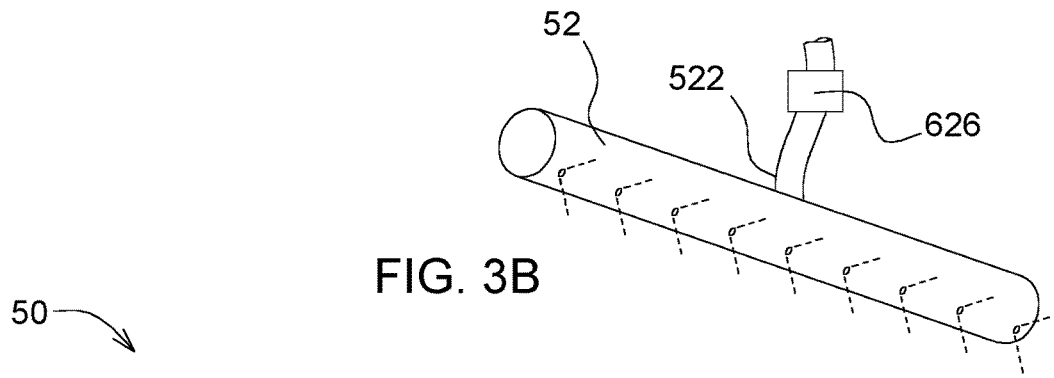
FIG. 3B is a schematic perspective view of another dispensing apparatus.

Another implementation of the dispensing apparatus 50 is shown in FIG. 3B. The dispensing apparatus 50 includes another manifold 52 in the form of a spray bar positioned laterally across the flow direction of the crop material. The manifold 52 has an inlet 522 coupled to the preservative tank 40 and outlets 524 in the form of multiple holes configured for dispensing the preservative. In alternative, the outlets 524 (holes) may be installed with nozzles, which is not shown.

Figure 3C:
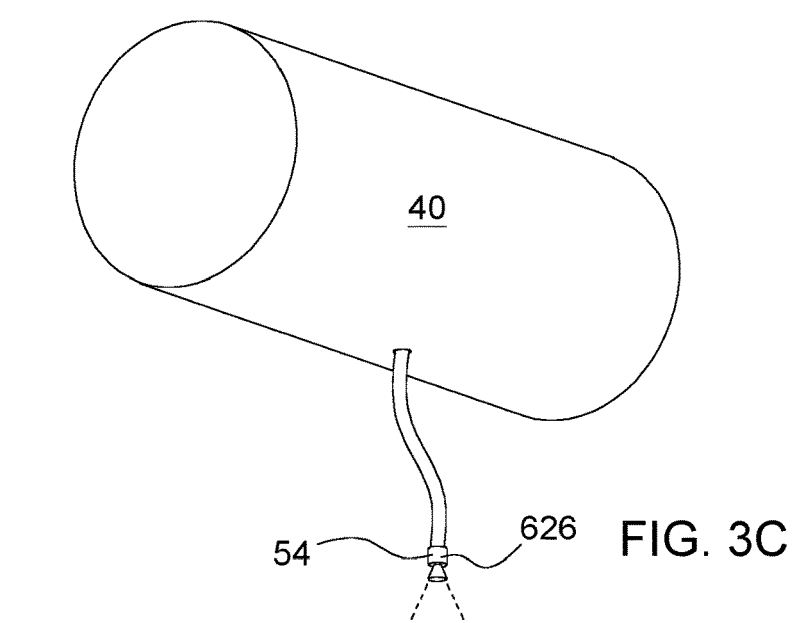
FIG. 3C is a schematic perspective view of another dispensing apparatus.

Another implementation of the dispensing apparatus 50 is shown in FIG. 3C. The dispensing apparatus 50 includes a hose directly connecting the preservative tank and the nozzle 54 in a form of an outlet without the manifold 52, which is shown in FIGS. 3A and 3B.

Referring to FIGS. 4A-4C, 5A-5B, and 6, the present disclosure includes a liquid level monitoring system 60 configured to monitor the preservative level in the preservative tank 40. It is noted that the liquid level monitoring system 60 can also be applied to different types of fluid tank, such as water tank, oil tank, nutrition tank, etc.

The liquid level monitoring system 60 may include one or more sensors 62, a controller 64 coupled to or having a memory 642, and a display 66. The sensor 62 may include at least one liquid level sensor 622 configured to measure and/or sense data related to a level of the liquid/preservative in the preservative tank. The signals from the liquid level sensor 622 may later be received by the controller 64 to define and/or calculate a sensed fluid level value. Referring to FIG. 4A, the liquid level sensor 622 may include a float having a magnet attached thereto and moveable along a vertical tube in response to the level of the preservative (buoyancy). In another implementation, as shown in FIG. 4B, the liquid level sensor 622 may include an ultrasonic and/or light sensor coupled to the upper interior of the preservative tank 40. A source (ultrasound/light) is positioned in the preservative tank 40 and configured to emit ultrasound or light toward the surface of the preservative. The frequency and the wavelength of the ultrasound reflection or angle of the light reflection would change in response to the level of the preservative. The liquid level sensor 622 receives the reflection from the surface of the preservative. Referring to FIG. 4C, the liquid level sensor 622 may include a pressure sensor at the outlet of the preservative tank 40 or at the bottom of the preservative tank 40, and the pressure sensor is operable to measure the fluid pressure of the preservative. The fluid pressure changes in response to the level of the preservative. The measurements as shown in FIGS. 4A-4C are directly or indirectly related to the measurement of the liquid level. The controller 64 may receive the signals and use the data from the sensor 62 to determine the level of the liquid in the tank. The above-mentioned liquid level sensors 622 are described for explanatory purpose. The liquid level sensor 622 may include another type of sensor to measure the fluid level not described herein.

The controller 64 (or multiple controllers) is provided, in general, to control various aspects of operation of the baler implement 20, including the preservative level monitoring. The controller 64 may be defined as a computing device associated with microprocessors and the memory 642. The controller 64 may be coupled to or included by an electronic control unit (ECU). The controller 64 may communicate with various systems of the work vehicle 10 via a controller area network (CAN) bus or wireless connection, for example. The controller 64 is configured to receive commands from the operator control member to perform various tasks. The controller 64 is also configured to receive signal(s) from the sensors 62. For example, the controller 64 may receive the signals from the liquid level sensor 622 to define a sensed fluid level value based on the measured level of the liquid, and to save the sensed fluid level value in the memory 642. The display 66 is coupled to the controller 64 and is operable to display the sensed fluid level value. The controller 64 is also configured to determine whether one or several conditions is met, based on the signal from the sensors 62, which will be described in the next paragraph.

Figure 5B:
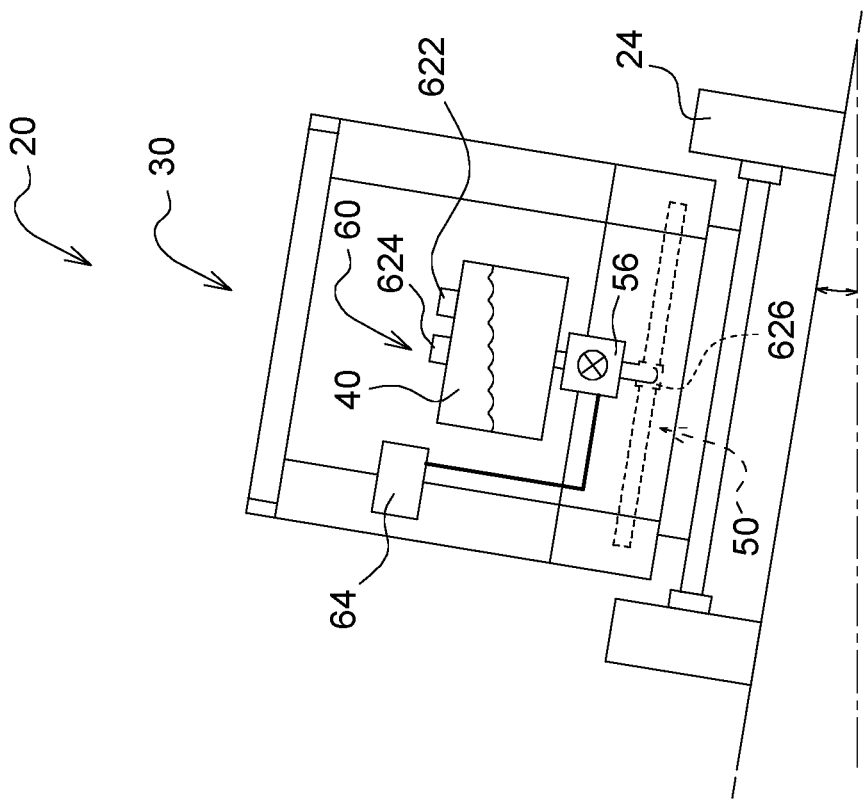
FIG. 5B illustrates the baler implement operating on another slope.
Figure 5A:
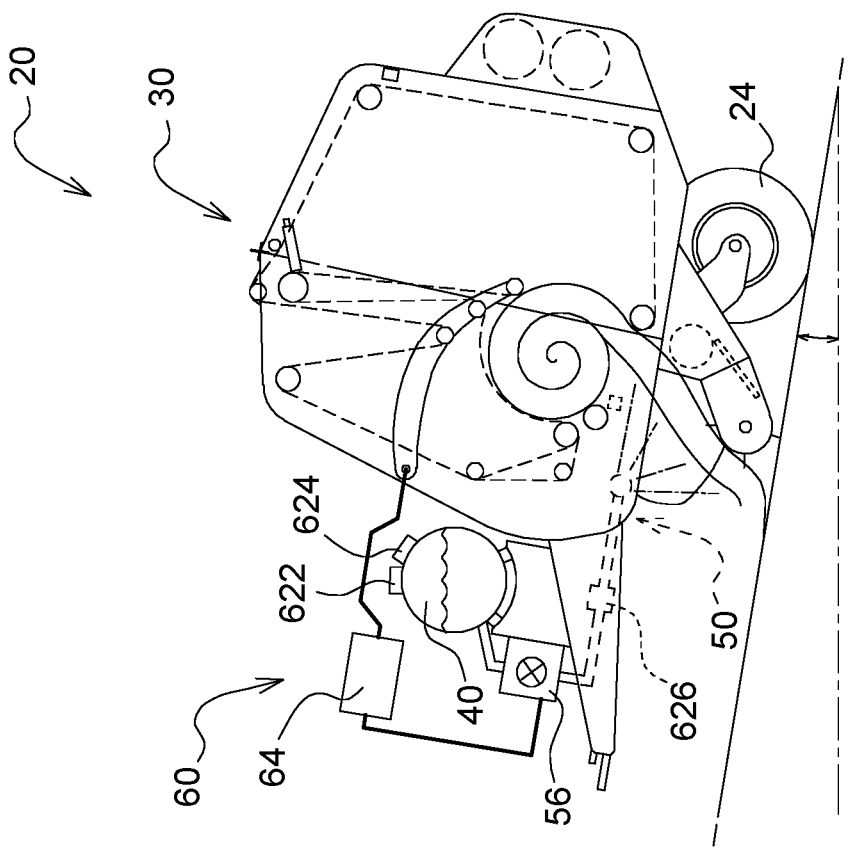
FIG. 5A illustrates the baler implement operating on a slope.
Figure 6:
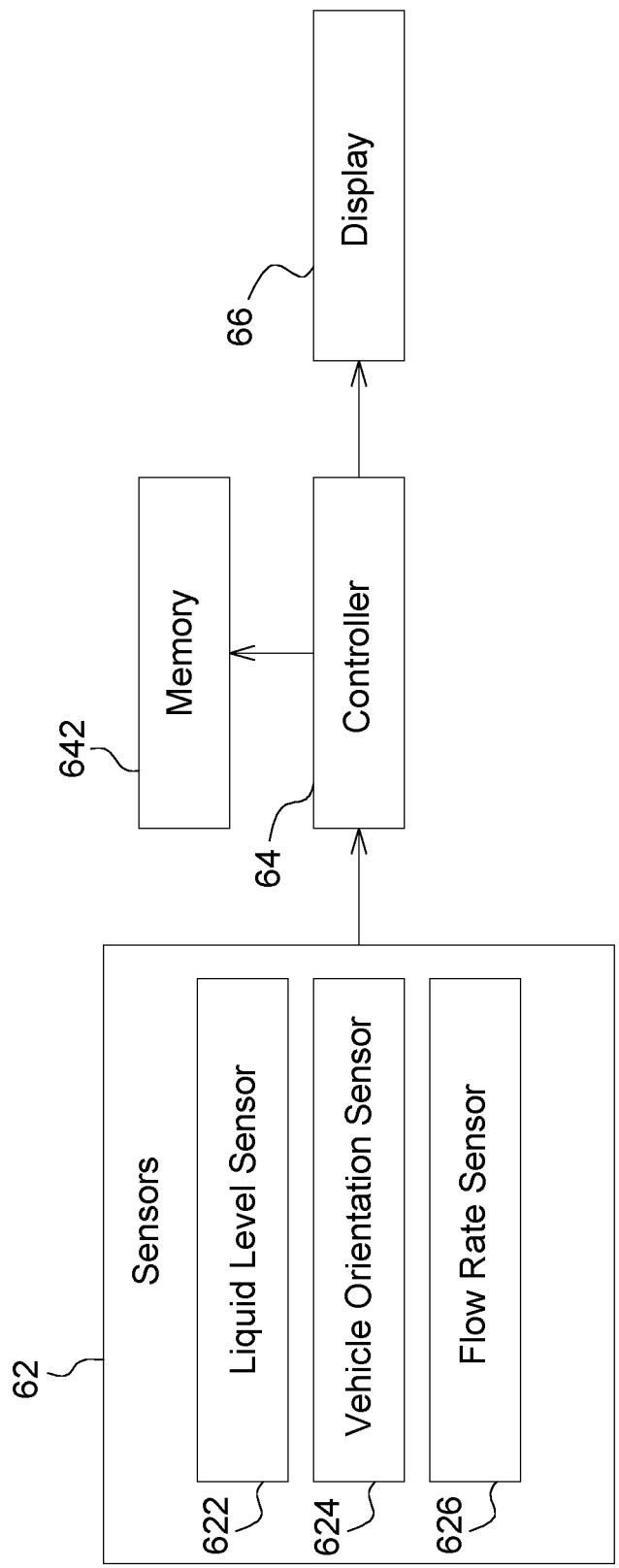
FIG. 6 is a block diagram showing a system for monitoring a level of a liquid in a tank.

However, the sensed fluid level value shown on the display 66 may not always be accurate when the moveable vehicle/baler implement 20 is traveling on a hill or slope. As shown in FIGS. 5A and 5B, the liquid level of preservative measured by the liquid level sensor 622 may render the actual volume of the liquid/preservative underestimated or overestimated. To mitigate the influence of the uneven or hilly terrain, the liquid level monitoring system 60 further includes a vehicle orientation sensor 624 operable to sense an orientation of the moveable vehicle/baler implement 20 relative to a horizontal plane. The vehicle orientation sensor 624 may be a gyroscope but can be other type of sensor(s) to sense the orientation of the moveable vehicle/baler implement 20. The controller 64 is coupled to the vehicle orientation sensor 624 and is operable to determine if the orientation of the moveable vehicle/baler implement 20 is less than an allowable orientation threshold or if the orientation of the moveable vehicle is equal to or greater than the allowable orientation threshold. The logic of the comparison between the orientation of the moveable vehicle and the allowable orientation threshold may be saved in the memory 642 as part of the program. The allowable orientation threshold may be a pre-determined value saved in the memory. When the orientation of the moveable vehicle/baler implement 20 is less than an allowable orientation threshold, the controller 64 defines a sensed fluid level value based on the measured level of the liquid (measured by the liquid level sensor 622) and saves the sensed fluid level value in the memory 642. As such, when the orientation of the moveable vehicle/baler implement 20 is less than the allowable orientation threshold, the display 66 may display the sensed fluid level value. On the contrary, in one implementation, when when the orientation of the moveable vehicle/baler implement 20 is equal to or greater than the allowable orientation threshold, the controller 64 may discontinue or stop measuring the level of the liquid in the preservative tank 40 of the moveable vehicle/baler implement 20 with the liquid level sensor 622, stop defining a sensed fluid level value, stop saving the sensed fluid level value in the memory 642, and/or stop allowing the display 66 to display the sensed fluid level value, which may not be accurate.

Additionally, when there is a transition that the orientation of the moveable vehicle/baler implement 20 relative to the horizontal plane is from equal to or greater than the allowable orientation threshold to less than the allowable orientation threshold for less than a minimum time period, the controller 64 functions as if the orientation of the moveable vehicle/baler implement 20 relative to the horizontal plane is from equal to or greater than the allowable orientation threshold, i.e., discontinues or stops measuring the level of the liquid in the tank of the moveable vehicle/baler implement 20 with the liquid level sensor, discontinues or stops defining the sensed fluid level value, discontinues or stops saving the sensed fluid level value in the memory 642, and/or discontinues or stops allowing the display 66 to display the sensed fluid level value. As such, the display 66 will not display the potentially inaccurate sensed fluid level value due to the wave created during the transition. On the contrary, when the orientation of the moveable vehicle/baler implement 20 is less than the allowable orientation threshold for a period of time that is greater than the minimum time period, the sensed fluid level value may be reliable, and the liquid level sensor 622 may measure the level of the liquid in the preservative tank 40 of the moveable vehicle/baler implement 20.

Alternative to not measuring the level of the liquid in the preservative tank 40 of the moveable vehicle/baler implement 20 with the liquid level sensor, not defining the sensed fluid level value, not saving the sensed fluid level value in the memory 642, and/or not allowing the display 66 to display the sensed fluid level value, the multiple sensors 62 include at least one flow rate sensor 626 directly measured the flow rate of the preservative dispensed from the preservative tank 40, or indirectly measured the volume of the preservative dispensed from the preservative tank 40 together with the controller 64. Based on the volume of the liquid dispensed from the preservative tank 40, the controller 64 defines an estimated fluid level value when the orientation of the moveable vehicle/baler implement 20 is equal to or greater than the allowable orientation threshold. More specifically, the controller 64 defines the estimated fluid level value includes determining the volume of the fluid dispensed from the preservative tank during a time duration beginning when the orientation of the moveable vehicle/baler implement 20 changes from being less than the allowable orientation to being equal to or greater than the allowable orientation threshold, and with the time duration ending with the next occurrence of the orientation of the moveable vehicle/baler implement 20 changing from being equal to or greater than the allowable orientation threshold to being less than the allowable orientation threshold. The display 66 displays the estimated fluid level value when the orientation of the moveable vehicle/baler implement 20 is equal to or greater than the allowable orientation threshold.

Additionally, when there is a transition of the orientation of the moveable vehicle/baler implement 20 relative to the horizontal plane being from equal to or greater than the allowable orientation threshold to less than the allowable orientation threshold within a minimum time period, the controller 64 functions as if the orientation of the moveable vehicle/baler implement 20 relative to the horizontal plane is from equal to or greater than the allowable orientation threshold, i.e., the controller 64 defines the estimated fluid level value, determines the volume of the fluid dispensed from the preservative tank 40 during a time duration beginning when the orientation of the moveable vehicle/baler implement 20 changes from being less than the allowable orientation to being equal to or greater than the allowable orientation threshold, and with the time duration ending with the next occurrence of the orientation of the moveable vehicle/baler implement 20, changes from being equal to or greater than the allowable orientation threshold to being less than the allowable orientation threshold. As such, the display 66 will display the estimated fluid level value. On the contrary, when the orientation of the moveable vehicle/baler implement 20 is less than the allowable orientation threshold for a period of time that is greater than a minimum time period, the sensed fluid level value may be reliable, and the liquid level sensor 622 measures the level of the liquid in the preservative tank 40 of the moveable vehicle/baler implement 20.

It is noted that the flow rate sensor 626 is coupled to an outlet in fluid communication with the preservative tank 40. The outlet herein can be any part of elements between the preservative tank 40 and nozzle(s) 54. For example, the flow rate sensor 626 may be positioned on a hose between the preservative tank 40 and the pump 56. The flow rate sensor 626 in another example may be positioned inside the pump 56 and measure movement of the internal element, such as the gear rotatory speed inside the pump 56. The flow rate sensor 626 in another example may be positioned on the inlet 522 of the manifold 52 (or spray bar) as shown in FIGS. 3A and 3B. The flow rate sensor 626 in another example may be positioned on the nozzle 54, as shown in FIG. 3C.

Figure 7:
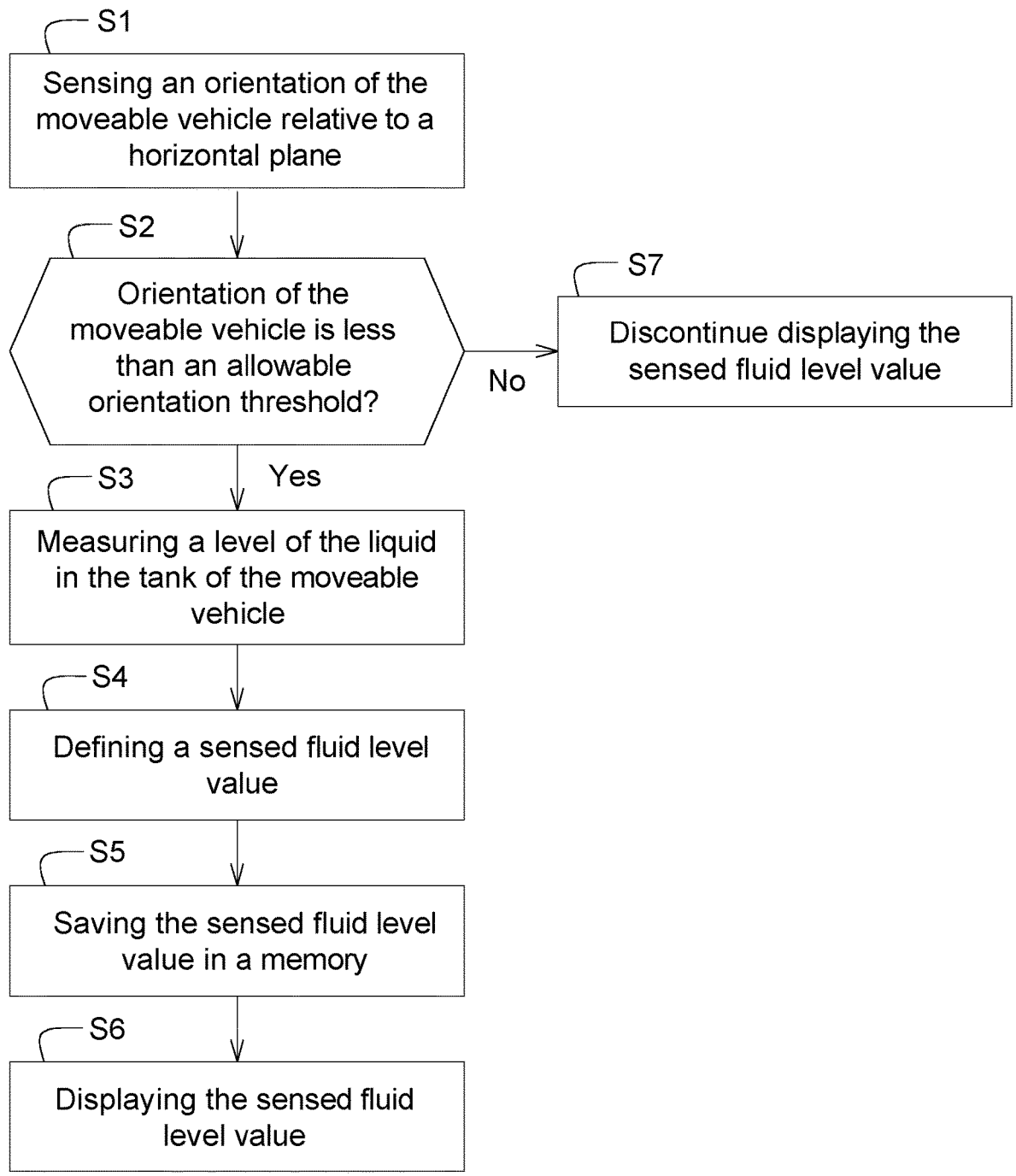
FIG. 7 is a flow chart of a method of monitoring a level of a liquid in a tank.

The present disclosure also include methods of monitoring a level of a liquid in a tank of a moveable vehicle. The first method, as shown in FIG. 7, includes:

S1: sensing an orientation of the moveable vehicle relative to a horizontal plane with a vehicle orientation sensor. The vehicle orientation sensor is a gyroscope.

S2: determining, with a controller, if the orientation of the moveable vehicle is less than an allowable orientation threshold or if the orientation of the work vehicle is equal to or greater than the allowable orientation threshold. If the orientation of the moveable vehicle is less than an allowable orientation threshold, go to S3. If the orientation of the work vehicle is equal to or greater than the allowable orientation threshold, go to S7.

S3: measuring a level of the liquid in the tank of the moveable vehicle with a liquid level sensor when the orientation of the moveable vehicle is less than the allowable orientation threshold.

S4: defining a sensed fluid level value with the controller. The sensed fluid level value is based on the measured level of the liquid when the orientation of the moveable vehicle is less than the allowable orientation threshold.

S5: saving the sensed fluid level value in a memory of the controller.

S6: displaying the sensed fluid level value by a display.

S7: stop measuring the level of the liquid in the tank, defining the sensed fluid level value, saving the sensed fluid level value, or displaying the sensed fluid level value.

Figure 8:
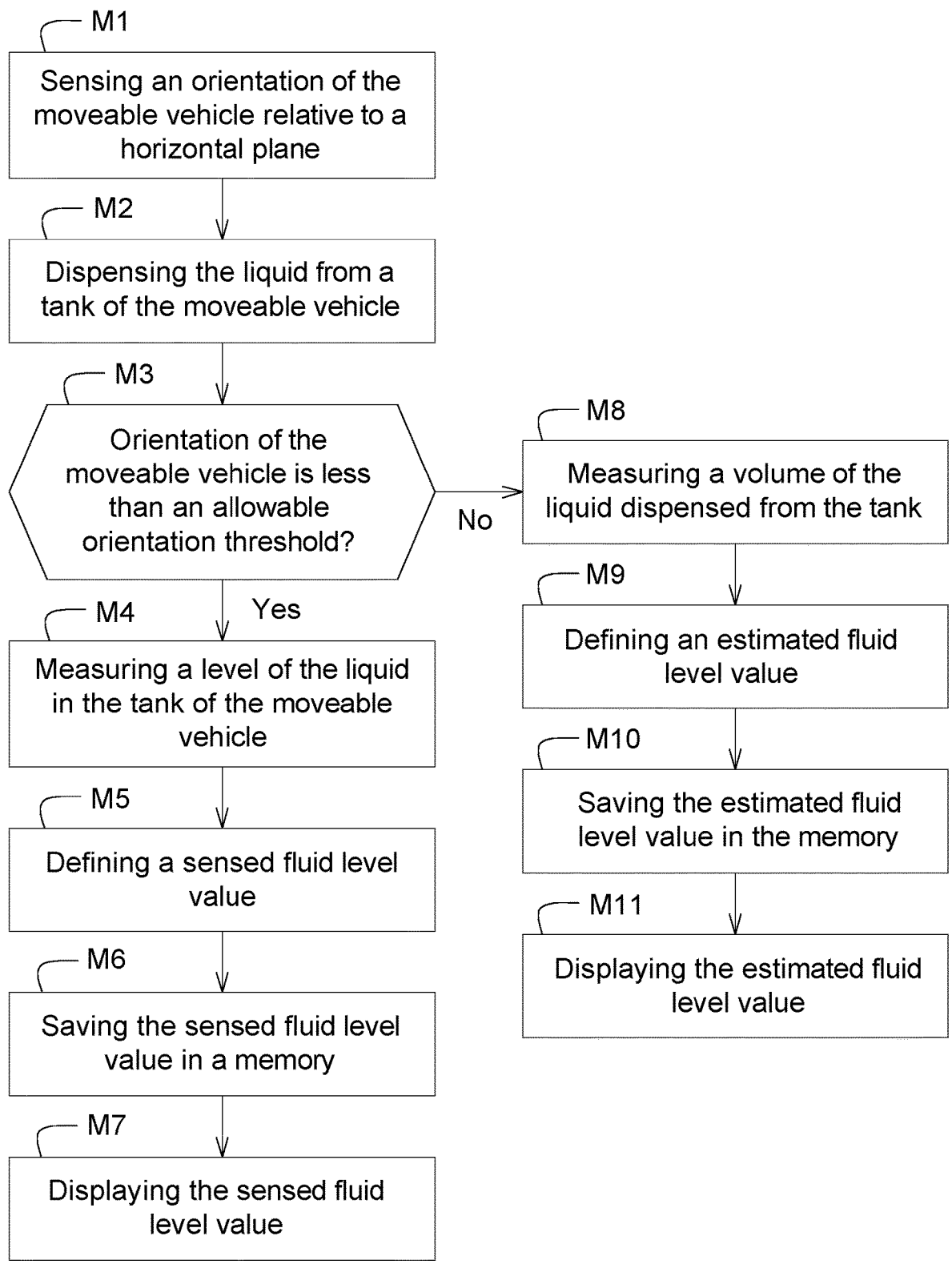
FIG. 8 is a flow chart of another method of monitoring a level of a liquid in a tank.

The second method, as shown in FIG. 8, includes:

M1: sensing an orientation of the moveable vehicle relative to a horizontal plane with a vehicle orientation sensor. The vehicle orientation sensor is a gyroscope.

M2: dispensing the liquid from the tank of the moveable vehicle.

M3: determining, with a controller, if the orientation of the moveable vehicle is less than an allowable orientation threshold or if the orientation of the work vehicle is equal to or greater than the allowable orientation threshold. If the orientation of the moveable vehicle is less than an allowable orientation threshold, go to M4. If the orientation of the work vehicle is equal to or greater than the allowable orientation threshold, go to M8.

M4: measuring a level of the liquid in the tank of the moveable vehicle with a liquid level sensor when the orientation of the moveable vehicle is less than the allowable orientation threshold.

M5: defining a sensed fluid level value with the controller. The sensed fluid level value is based on the measured level of the liquid when the orientation of the moveable vehicle is less than the allowable orientation threshold.

M6: saving the sensed fluid level value in a memory of the controller.

M7: displaying the sensed fluid level value by a display.

M8: measuring a volume of the liquid dispensed from the tank with a flow sensor.

M9: defining an estimated fluid level value with the controller when the orientation of the moveable vehicle is equal to or greater than the allowable orientation threshold. The estimated fluid level value is based on the volume of the liquid dispensed from the tank. In addition, M9 also includes determining the volume of the fluid dispensed from the tank during a time duration beginning when the orientation of the moveable vehicle changes from being less than the allowable orientation to being equal to or greater than the allowable orientation threshold, and with the time duration ending with the next occurrence of the orientation of the moveable vehicle changing from being equal to or greater than the allowable orientation threshold to being less than the allowable orientation threshold.

In other word, the time duration begins at M3 when the orientation of the moveable vehicle changes from being less than the allowable orientation to being equal to or greater than the allowable orientation threshold, and the duration ends if the next occurrence of the orientation of the moveable vehicle changing from being equal to or greater than the allowable orientation threshold to being less than the allowable orientation threshold.

M10: saving the estimated fluid level value in the memory of the controller

M11: displaying the estimated fluid level value of the tank when the orientation of the moveable vehicle is equal to or greater than the allowable orientation threshold.

Referring to M7 and M11, M7 includes displaying only the sensed fluid level value of the tank when the orientation of the moveable vehicle is less than the allowable orientation threshold, and M11 includes displaying only the estimated fluid level value of the tank when the orientation of the moveable vehicle is equal to or greater than the allowable orientation threshold. However, in other implementation, the display may display both of the sensed fluid level value of the tank and the estimated fluid level value of the tank when the orientation of the moveable vehicle is less than the allowable orientation threshold and/or is equal to or greater than the allowable orientation.

Figure 9:
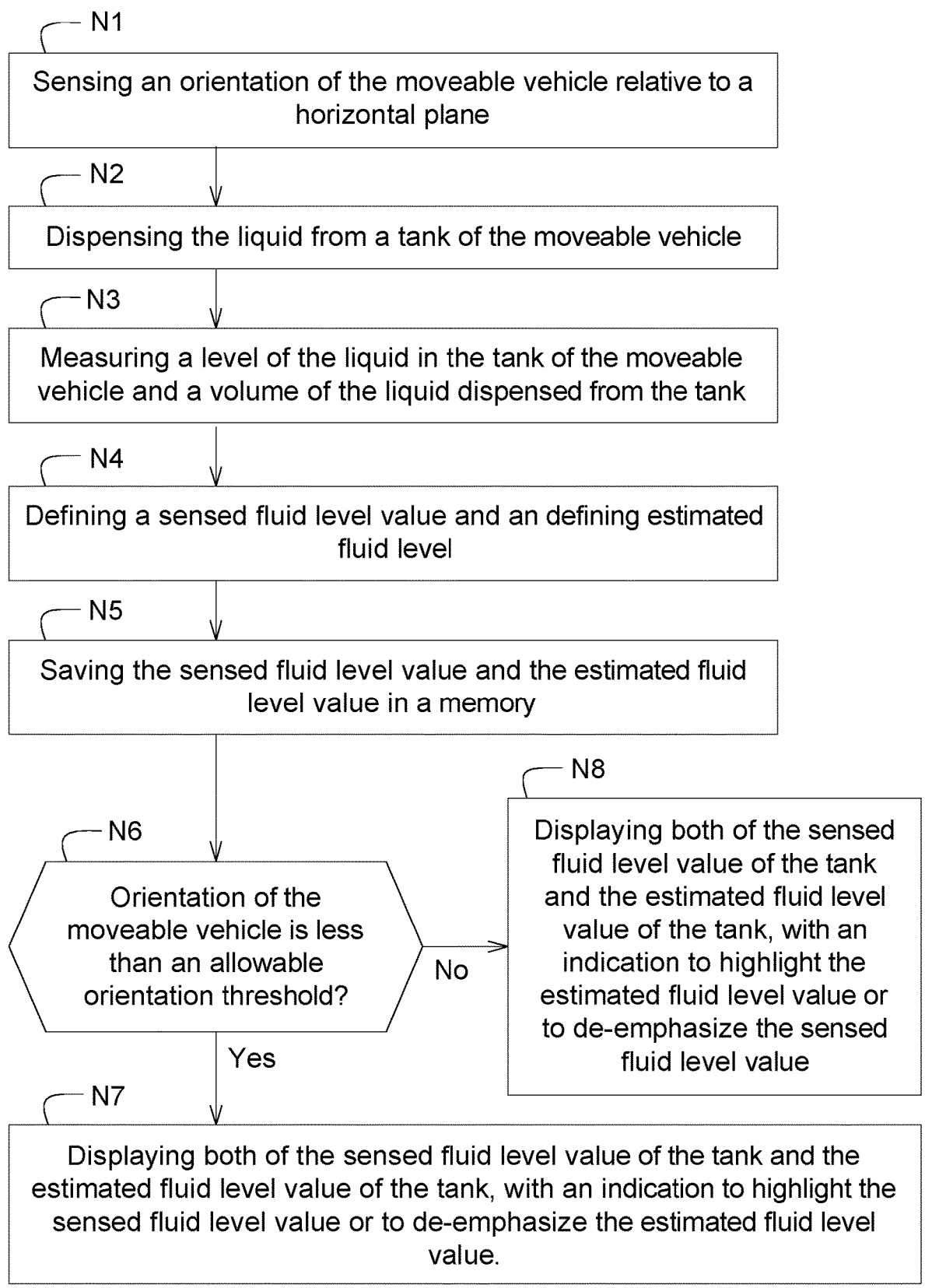
FIG. 9 is a flow chart of another method of monitoring a level of a liquid in a tank.

The third method, as shown in FIG. 9, includes:

N1: sensing an orientation of the moveable vehicle relative to a horizontal plane with a vehicle orientation sensor.

N2: dispensing the liquid from the tank of the moveable vehicle.

N3: measuring a level of the liquid in the tank of the moveable vehicle with a liquid level sensor and measuring a volume of the liquid dispensed from the tank with a flow sensor N4: defining a sensed fluid level value and a defining estimated fluid level with the controller. The sensed fluid level value is based on the measured level of the liquid. The estimated fluid level value is based on the volume of the liquid dispensed from the tank.

N5: saving the sensed fluid level value and the estimated fluid level value in a memory of the controller.

N6: determining whether the orientation of the moveable vehicle is less than an allowable orientation threshold. If yes, go to N7; if no, go to N8.

N7: displaying both of the sensed fluid level value of the tank and the estimated fluid level value of the tank, with an indication to highlight the sensed fluid level value or to de-emphasize the estimated fluid level value. The indication, for example, may include a circle to surround the sensed fluid level value or a bright background accompanied with the sensed fluid level value. In another example, the indication to de-emphasize may be a flash of the estimated fluid level value on the display.

N8: displaying both of the sensed fluid level value of the tank and the estimated fluid level value of the tank, with an indication to highlight the estimated fluid level value or to de-emphasize the sensed fluid level value. The indication, for example, may include a circle to surround the estimated fluid level value or a bright background accompanied with the estimated fluid level value. In another example, the indication to de-emphasize may be a flash of the sensed fluid level value on the display.

It is noted that the decision block (Orientation of the moveable vehicle is less than an allowable orientation threshold, S2 in FIG. 7, M3 in FIG. 8) may add a qualification before the process proceeds to measuring the level of the liquid in the tank (S3 in FIG. 7, M4 in FIG. 8), if there is a transition that the orientation of the moveable vehicle/baler implement 20 relative to the horizontal plane is from to be equal to or greater than the allowable orientation threshold to less than the allowable orientation threshold within a minimum time period. The first method still stops displaying the sensed fluid level value (S7 in FIG. 7), and the second method still measures a volume of the liquid dispensed from the tank (M8 in FIG. 8), so as to avoid an inaccurate sensed fluid level value being read due to the wave created in the transition.

Without in any way limiting the scope, interpretation, or application of the claims appearing below, a technical effect of one or more of the example embodiments disclosed herein allows an operator to avoid reading an inaccurate sensed fluid level value when the moveable vehicle travels on a slope that renders the orientation of the moveable vehicle is equal to or greater than the allowable orientation threshold. Another technical effect of one or more of the example embodiments disclosed herein is to provide estimated fluid level value when the moveable vehicle travels on a slope that renders the orientation of the moveable vehicle is equal to or greater than the allowable orientation threshold.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method of monitoring a level of a liquid in a tank of a moveable vehicle, the method comprising:
   sensing an orientation of the moveable vehicle relative to a horizontal plane with a vehicle orientation sensor;
   determining, with a controller, if the orientation of the moveable vehicle is less than an allowable orientation threshold or if the orientation of the moveable vehicle is equal to or greater than the allowable orientation threshold;
   measuring a level of the liquid in the tank of the moveable vehicle with a liquid level sensor when the orientation of the moveable vehicle is less than the allowable orientation threshold;
   defining a sensed fluid level value with the controller, wherein the sensed fluid level value is based on the measured level of the liquid when the orientation of the moveable vehicle is less than the allowable orientation threshold;
   saving the sensed fluid level value in a memory of the controller;
   dispensing the liquid from the tank;
   measuring a volume of the liquid dispensed from the tank with a flow sensor;
   defining an estimated fluid level value with the controller when the orientation of the moveable vehicle is equal to or greater than the allowable orientation threshold, wherein the estimated fluid level value is based on the volume of the liquid dispensed from the tank.

2. The method set forth in claim 1, wherein the vehicle orientation sensor is a gyroscope.

3. The method set forth in claim 1, wherein defining the estimated fluid level value includes determining the volume of the fluid dispensed from the tank during a time duration beginning when the orientation of the moveable vehicle changes from being less than the allowable orientation to being equal to or greater than the allowable orientation threshold, and with the time duration ending with the next occurrence of the orientation of the moveable vehicle changing from being equal to or greater than the allowable orientation threshold to being less than the allowable orientation threshold.

4. The method set forth in claim 1, comprising displaying at least one of the sensed fluid level value and the estimated fluid level value.

5. The method set forth in claim 4, comprising displaying only the estimated fluid level value of the tank when the orientation of the moveable vehicle is equal to or greater than the allowable orientation threshold, and displaying only the sensed fluid level value of the tank when the orientation of the moveable vehicle is less than the allowable orientation threshold.

6. The method set forth in claim 1, wherein measuring the volume of the liquid dispensed from the tank with the flow sensor includes measuring the volume of the liquid dispensed from the tank with the flow sensor when the orientation of the moveable vehicle is less than the allowable orientation threshold for a period of time.

7. The method set forth in claim 1, further comprising discontinuing measuring the level of the liquid in the tank of the moveable vehicle with the liquid level sensor when the orientation of the moveable vehicle is equal to or greater than the allowable orientation threshold.

8. The method set forth in claim 1, wherein dispensing the liquid from the tank is further defined as dispensing the liquid through an outlet in fluid communication with the tank, wherein the flow sensor is coupled the outlet.

9. The method set forth in claim 1, wherein the moveable vehicle is one of a baler, a planter, a sprayer, and a tractor.

10. The method set forth in claim 1, wherein measuring the volume of the liquid dispensed from the tank with the flow sensor includes measuring a flow rate of the liquid dispensed from the tank during a period of time.

11. The method set forth in claim 1, wherein defining the estimated fluid level value includes correlating the volume of the liquid dispensed from the tank to a change in fluid level.

12. The method set forth in claim 11, wherein defining the estimated fluid level value includes subtracting the change in fluid level from the sensed fluid level value saved in the memory to define the estimated fluid level value.

13. The method set forth in claim 1, further comprising saving the estimated fluid level value in the memory of the controller.

14. The method set forth in claim 1, comprising changing a flow rate of the liquid.

15. A system for monitoring a level of a liquid in a tank of a moveable vehicle, the system comprising:
a vehicle orientation sensor operable to sense an orientation of the moveable vehicle relative to a horizontal plane;
a controller coupled to the vehicle orientation sensor and operable to determine if the orientation of the moveable vehicle is less than an allowable orientation threshold or if the orientation of the moveable vehicle is equal to or greater than the allowable orientation threshold;
a liquid level sensor coupled to the controller and operable to measure a level of the liquid in the tank of the moveable vehicle;
an output operable to dispense the liquid from the tank;
a flow rate sensor operable to measure a flow rate of the liquid dispensed from the tank;
wherein the controller is operable to define a sensed fluid level value based on the measured level of the liquid when the orientation of the moveable vehicle is less than the allowable orientation threshold and to define an estimated fluid level value based on the flow rate of the liquid dispensed from the tank when the orientation of the moveable vehicle is equal to or greater than the allowable orientation threshold; and
wherein the controller is operable to save the sensed fluid level value in a memory of the controller.

16. The system set forth in claim 15, wherein the vehicle orientation sensor is a gyroscope.

17. The system set forth in claim 15, wherein the controller defines the estimate fluid level value of the tank includes determining the volume of the fluid dispensed from the tank during a time duration beginning when the orientation of the moveable vehicle changes from being less than the allowable orientation to being equal to or greater than the allowable orientation threshold, with the time duration ending with the next occurrence of the orientation of the moveable vehicle changing from being equal to or greater than the allowable orientation threshold to being less than the allowable orientation threshold.

18. The system set forth in claim 15, further comprising a display coupled to the controller and operable to display at least one of the sensed fluid level value and the estimated fluid level value.

19. The system set forth in claim 18, wherein the display displays only the estimated fluid level value of the tank when the orientation of the moveable vehicle is equal to or greater than the allowable orientation threshold and displays only the sensed fluid level value of the tank when the orientation of the moveable vehicle is less than the allowable orientation threshold.

20. The system set forth in claim 15, wherein the liquid level sensor measures the level of the liquid in the tank of the moveable vehicle when the orientation of the moveable vehicle is less than the allowable orientation threshold for a period of time that is greater than a minimum time period.

21. The system set forth in claim 15, wherein the controller discontinues measuring the level of the liquid in the tank of the moveable vehicle with the liquid level sensor when the orientation of the moveable vehicle is equal to or greater than the allowable orientation threshold.

22. The system set forth in claim 15, wherein the moveable vehicle is one of a baler, a planter, a sprayer, and a tractor.

23. The system set forth in claim 15, comprising a fluid pump changing the flow rate of the liquid.

* * * * *